United States Patent
Zscheile, Jr.

(10) Patent No.: US 6,501,808 B1
(45) Date of Patent: Dec. 31, 2002

(54) APPARATUS AND METHOD FOR INSTANTANEOUS REACQUISITION IN A NETWORK SYSTEM

(75) Inventor: John Walter Zscheile, Jr., Rockledge, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/301,950

(22) Filed: Apr. 29, 1999

(51) Int. Cl.$^7$ .................................................. H04L 7/00
(52) U.S. Cl. ........................ 375/356; 375/362; 455/431; 455/502
(58) Field of Search .................................. 375/130, 219, 375/259, 354, 356, 357, 358, 362; 370/503, 508, 507, 519; 455/427, 430, 431, 13.2, 500, 502, 503; 342/357.12, 357.06

(56) References Cited

U.S. PATENT DOCUMENTS

| | | | | |
|---|---|---|---|---|
| 4,882,739 A | * | 11/1989 | Potash et al. ................ | 375/358 |
| 4,893,318 A | * | 1/1990 | Potash et al. ................ | 375/358 |
| 5,257,404 A | * | 10/1993 | Goreham et al. ............ | 455/503 |
| 5,261,118 A | * | 11/1993 | Vanderspool, II et al. .. | 455/503 |
| 5,280,629 A | * | 1/1994 | Lo Galbo et al. ............ | 455/503 |
| 5,483,665 A | * | 1/1996 | Linquist et al. ............. | 455/13.1 |

\* cited by examiner

*Primary Examiner*—Phuong Phu
(74) *Attorney, Agent, or Firm*—Stetina Brunda Garred & Brucker

(57) ABSTRACT

A data link network system comprising a central node airborne station and a plurality of ground stations each having multi-channel transmitter/receiver capable of transmitting quadrature phase spread spectrum signals and in phase spread spectrum signals both of which contain data. One of said quadrature channels is maintained as a master channel which provides a master time of day clock in the airborne platform of the network system and the other channel is employed as an adjustable time of day clock channel for resynchronizing ground stations after an outage. When an outage occurs between the airborne station and one of the ground stations the airborne station calculates the propagation time to the ground station and shifts the adjustable channel to transmit a spread spectrum data signal which will arrive in synchronization with the time of day in the ground station that had the outage. The transmitted data signal is instantaneously reacquired by the ground station and the data transmitted is employed to resynchronize the ground station receiver/transmitter with the master clock in the airborne receiver/transmitter.

12 Claims, 4 Drawing Sheets

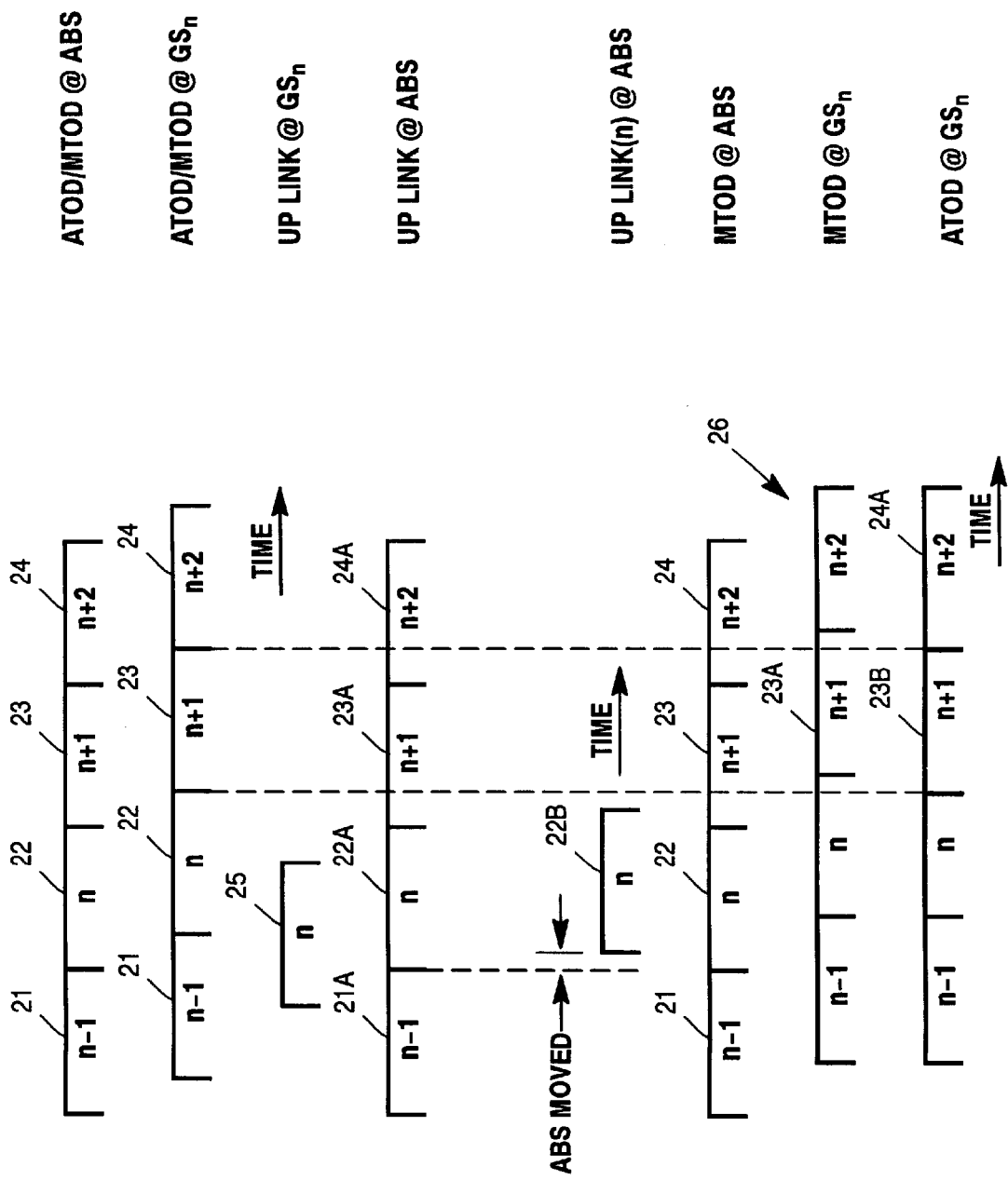

APPARATUS AND METHOD FOR INSTANTANEOUS REACQUISITION IN A NETWORK SYSTEM

RELATED APPLICATIONS

The present invention relates to my co-pending U.S. Applications, Ser. No. 107,209 filed Jun. 29, 1998 for A Method for Dissemination of Multi-Sensor Products and U.S. Application, Ser. No. 107,208 filed Jun. 29, 1998 for an Adaptable and Controllable Multi-Channel Data Link.

BACKGROUND OF THE INVENTION

1. Field of the Invention

The present invention relates to communication data links of the type employed between an airborne platform or platforms and ground stations. More particularly, the present invention relates to a novel multi-channel data link where each channel contains a time of day spread spectrum waveform having means for independently advancing and retarding the time of day in each of the quadrature channels to enable instantaneous reacquisition of a ground station after an outage has occurred.

2. Description of the Prior Art

It is known that airborne surveillance platforms are used to capture optical images, infrared images and/or radar images and to process the sensed image information into a digital format and then communicate this image information to plural ground stations over a data link using secure spread spectrum modulated waveforms. When the airborne platform encounters an obstacle between it and the ground station, the ground station loses its spread spectrum synchronization or lock of the down link signal. Correspondingly, the airborne platform also loses its synchronization or lock on the up link signal from the ground station. Any attempt by the airborne platform to advance or retard its down link signal to aid the ground station to reacquire the down link signal will cause the other ground stations to lose their lock or synchronization on their down link signals.

The problem is made worse when the down link signals are transmitted in predetermined time slots using Time Division Multiple Access (TDMA) format because the airborne platform is moving and its signal time of propagation is continuously changing.

Heretofore, multi-channel in-phase (I) and quadrature phase (Q) multi-channel transmitters were known, but were employed to enhance the amount of power received at a receiver. Such systems are explained in my U.S. Pat. No. 5,559,788 which is incorporated by reference herein. In the two co-pending U.S. applications referenced above, the power and data rate of the in-phase and quadrature channels were adjusted to overcome jamming of one ground station which could cause an outage of the network system or a reduction in the data rate of the entire network system.

None of the systems discussed hereinbefore have addressed the problem that occurs when an outage of one or more ground stations in a network system requires reacquisition of the ground station as rapidly as possible. Thus, it would be desirable to provide an apparatus and a method for instantaneously reacquiring a ground station back into a network system after an outage has occurred.

SUMMARY OF THE INVENTION

It is a principal object of the present invention to virtually eliminate reacquisition time of a ground station into a surveillance system or network.

It is a principal object of the present invention to provide a multi-channel Data Link System in which one quadrature channel is maintained as a master time of day spread spectrum waveform and the other channel is independently varied in phase time relationship relative to the master channel to provide a reacquisition down link signal to the ground station.

It is a principal object of the present invention to calculate a propagation time from an airborne station or node to a ground station at the time of reacquisition so that the down link signal is synchronized at the time of reception by the ground station's receiver whose time of day clock is known.

It is a principal-object of the present invention to calculate a time of day correction signal at the air-borne station for a ground station to enable the ground station to reacquire and resynchronize its time of day clock with the master time of day clock in the airborne station.

It is a principal object of the present invention to resynchronize the phase and time of day signal of the adjustable in-phase channel in the airborne station with the master channel once all ground stations have been reacquired.

According to these and other objects of the present invention there is provided in a Data Link Network System a central node or airborne station with a multi-channel transmitter/receiver capable of transmitting quadrature phase spread spectrum signals both of which contain data. One channel is maintained as a master channel which provides a master time of day clock for the network system and the other channel is employed as an adjustable time of day channel. After an outage between the airborne station and one of its ground station's the airborne station calculates the propagation time to the ground station and shifts the adjustable channel to transmit a spread spectrum data signal which will arrive in synchronization with the time of day clock in the ground station that has the outage. The transmitted data signal is instantaneously reacquired by the ground station and the data accompanying the down link transmission is employed to resynchronize the ground station receiver/transmitter with the master clock in the airborne receiver/transmitter.

BRIEF DESCRIPTION OF THE DRAWINGS

FIGS. 3A, 3B, 3C and 3D are waveforms used to explain the propagation time between an airborne station and one of a plurality of ground stations before an outage has occurred;

FIGS. 4A, 4B, 4C and 4D are waveforms used to explain the novel invention and how the ground stations are capable of reacquiring the airborne down link signal without having to perform an acquisition search.

DETAILED DESCRIPTION OF THE PREFERRED EMBODIMENTS

Figure 1:
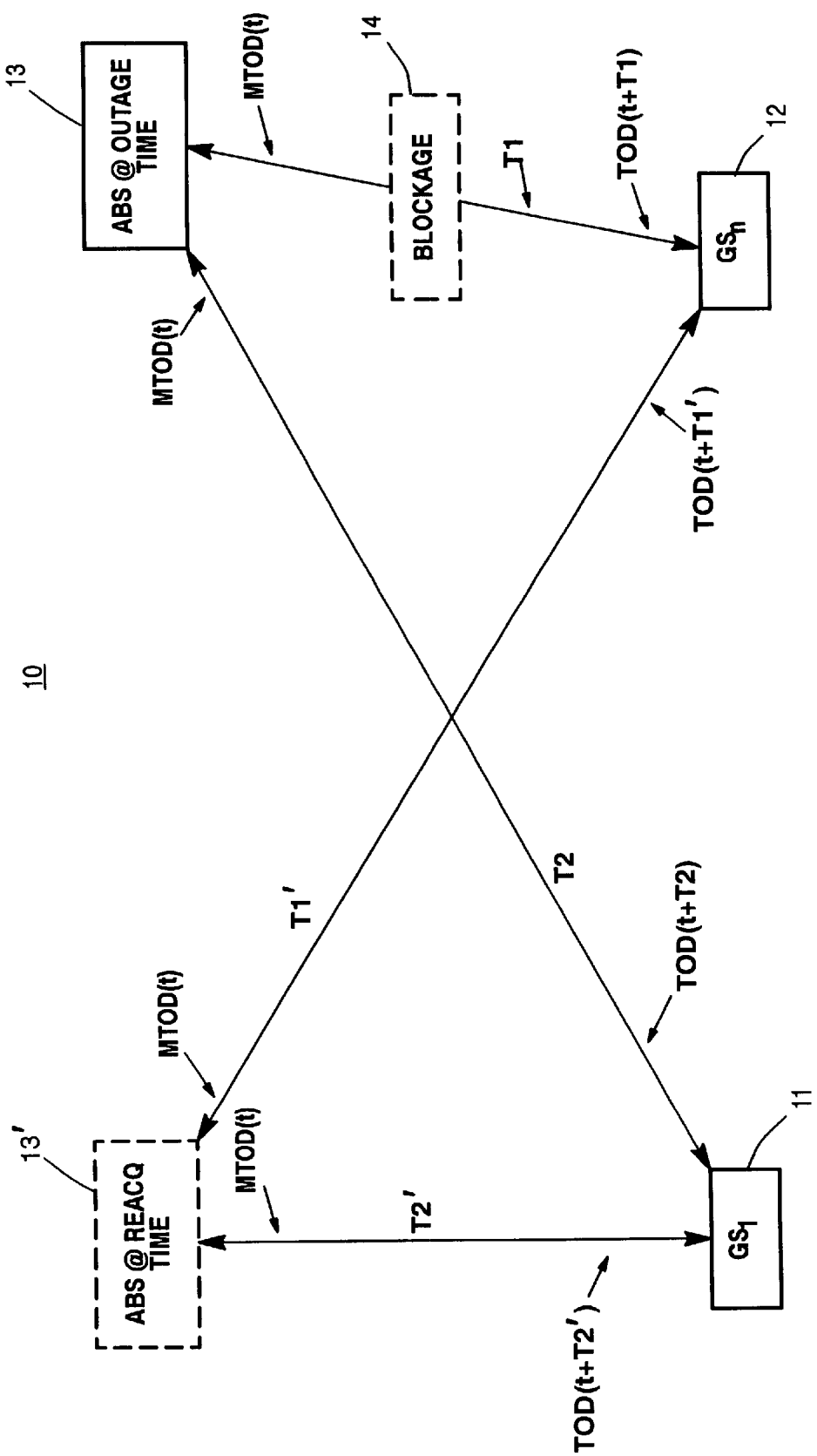
FIG. 1 is a schematic block diagram of a prior art surveillance system showing a plurality of fixed ground stations that are adapted to communicate with a single or point source moving airborne station over a single channel.

Refer now to FIG. 1 showing a prior art single channel data link network system 10 comprising a plurality of ground stations 11 to 12 and a single central node or airborne station 13. At the time of outage the airborne station 13 has some blockage 14 or condition which prevents its down link signal from reaching the ground station 12. This blockage or outage can be caused by terrain masking or aircraft shadowing or other reasons. In any event the ground station is not capable of communicating with the airborne station 13. However, the airborne station 13 at the time of outage with ground station 12 is still capable of communicating with ground station 11. After the airborne or central node station 13 has moved to a new position shown by phantom lines at block 13' it has a line of sight or communication ability with both ground station 11 and ground station 12. However, the ground station 12 has lost its synchronization with the master time of day clock which is part of the control system of the airborne station 13, 13'.

In this single channel embodiment the master time of day (t) in the airborne station 13 was changed during its propagation time T1 and T2. It will be noted that the propagation times T1 and T2 differ substantially and the time of arrival of the signal at ground station 11 and ground station 12 before outage is shown as t plus T2 and t plus T1, respectively. After the airborne station has moved to its new position shown at block 13' the new time of day arrival of the signals has changed to t plus T2' and t plus T1', respectively. Thus, it will be understood that any attempt of the airborne station 13 to correct its single channel time of day clock to aid in the acquisition of ground station 12 after outage will automatically cause the ground station 11 to see a changing time of day signal which will cause it to lose lock or synchronization. Thus, it will be understood that in this prior art embodiment it was the ground station 12 responsibility to do a search and reacquisition on its own to reacquire the master time of day clock t still being transmitted by the airborne station at its location 13'.

Figure 2:
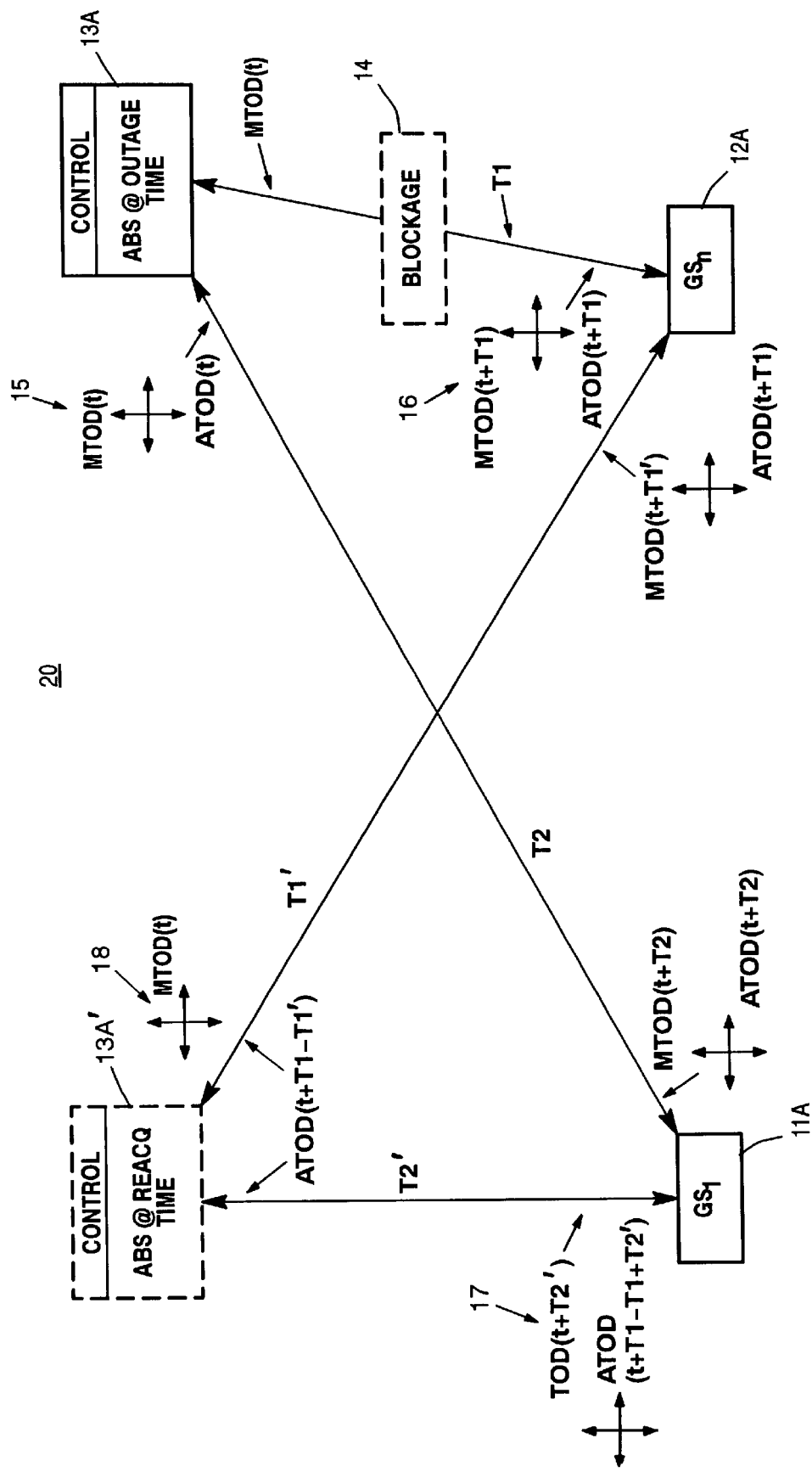
FIG. 2 is a schematic diagram showing a surveillance system having one of a plurality of ground stations that has lost its data link lock due to some reason and is attempting the reacquisition of the airborne signal from a new and unknown location after losing its lock.

Refer now to FIG. 2 showing a schematic block diagram of a surveillance system 20 having a plurality of ground stations and a single central node 13A similar to that described in FIG. 1. In the preferred embodiment of the present invention the transmitter/receiver and control systems in the central node 13A and 13A' have been modified to transmit dual or multi-channel signals and the ground stations 11A and 12A have transmitter/receivers that have been modified to receive the multi-channel or dual channel signals. To illustrate the preferred embodiment of the present invention, a diagrammatic signal 15 is shown having a vertical vector illustrating the master time of day t and a horizontal vector illustrating an adjustable time of day t which are in quadrature phase relationship with each other so as to avoid cross-channel interference. Thus, the time of day of the signal shown as T1 leaving the airborne station 13A is illustrated by the signal 15 which is also applied to the same signal transmitted to receiver 11A but with a propagation time T2. The time of arrival of the dual channel signal from central node or airborne station 13A at ground station 12A is shown as a multi-channel signal having a master time of day t plus T1 and an adjustable time of day signal t plus T1 at the time of outage caused by the obstruction 14. In a similar manner, the same signal 15 is shown at time of arrival at ground station 11A as having a master time of day t plus T2 and an adjustable time of day t plus T2 at the time of outage.

After the airborne station 13A has moved to a new position shown as block 13A', the obstruction 14 is no longer in the line of sight and has been removed. It will be understood that the ground station 11A has continued its communication with its up link and down link signals with the airborne station 13A without interruption. Thus, the down link signal having a propagation time T2' is arriving as a complex signal or dual channel signal shown by the vectors 17. The down link signal at the time of transmission from the airborne station 13A' is shown at the vector 18 comprising a master time of day clock t and an adjustable time of day clock t plus T1 minus T1' after adjustment.

Stated differently, the airborne station 13A' desires to transmit an adjusted signal that will arrive in synchronization with the adjusted time of day clock shown as t plus T1 at ground station 12A. This is accomplished by adjusting the adjustable time of day clock at the airborne station 13A to t plus T1 minus T1' and the adjusted signal arrives at the ground station 12A such that the T1' propagation time cancels out and the ground station 12A receives its signals as if the airborne station was still at the outage position 13A.

At this point in time, the ground station 12A correlates its local time of day with the adjusted down link signal. Station 12A then uses this course lock correlation to perform precise time of day lock-on such that any residual time difference between the ground stations local time of day and the received adjusted time of day are removed. It is now necessary for the ground station 12A to inform the central node or airborne station 13A that it has acquired synchronization. Ground station 12A employs the down link information supplied by the airborne station to adjust its own clock so that it is synchronized to the master time of day (t) in the airborne platform 13A' as will be explained in greater detail hereinafter. It will be explained that when this adjustment is complete that the factor T1 minus T1' will be eliminated from the master clock equation and both channels will be in synchronization with the master time of day clock.

It will be understood that the ground station 11A was tracking the master time of day and continues tracking the master time of day while this adjustment has been transpiring. Thus, it maintains its own synchronization and its time of day clock has not been changed.

Refer now to waveform FIG. 3A showing a series of time of day epochs 21 through 24 that are occurring at the airborne station 13A. As will be explained hereinafter, these epochs or time of day slots may be used for time division multiple access time slots.

Refer now to FIG. 3B which shows the delay in time shifted time epoch slots 21 through 24 at the time of arrival at the ground station 12A before any outage has occurred.

Refer now to FIG. 3C showing a time slot 25 which occurs at the ground station 12A at the time of its up link transmission. The time slot 25 is transmitted in time prior to the occurrence of its time slot allocated by the receiver but at the time of arrival at the airborne station 13A, it will synchronize with and occur at time slot 22. It will be understood that data is usually transmitted during this time slot 25 for arrival at the airborne station during time slot 22.

Refer now to FIG. 3D showing the composite for four ground stations up link time slots at the time of arrival at the airborne station 13A. The four stations have their transmitted data arriving at the airborne station in perfect synchronization with the epochs 21 through 24. It will be understood that each of the plurality of ground stations GS1 to GSN has its own unique time slot and the airborne station 13A has a unique epoch or time slot for arrival of the information in the ground station's time slot which occurs in synchronism with the occurrence of the time slots 21 through 24 shown as data 21A to 24A.

Refer now to FIG. 4A showing a time slot N(22B) at its time of arrival at the airborne station 13A'. Note that the airborne station 13A has moved to a new position 13A' causing a displacement in time shown as "ABS moved" which lengthens the previous propagation time shown as T1. The airborne station 13A' knows its old position and its new position and knows the position of the ground station 12A, thus is able to calculate the propagation time T1'. The difference between T1' minus T1 is the factor "ABS moved". Once the airborne station 13A receives a signal such as 22B, it knows that the obstruction 14 has been removed and line of sight communication has been reestablished with the ground station 12A. At this time, the airborne station 13A' is able to make the adjustment time of day calculation t plus T1 discussed hereinbefore so that the signal transmitted to the ground station will be synchronized with the time of day clock in the ground station 12A at the time of outage.

Refer now to FIG. 4B showing the master time of day epochs at the airborne station 13A' after outage. It will be noted that these epochs and waveform are identical to that explained hereinbefore with reference to FIG. 3A, but will now be used for explaining the adjustment of the master time of day clock in the ground station.

Refer now to FIG. 4C showing the master time of day epochs or clock at the ground station 12A at the time of arrival and after the obstruction 14 has been removed. It will be noted that this waveform 26 is not synchronized with the waveform shown in FIG. 3B but has been shifted by the amount shown as "ABS moved" in FIG. 4A. Without any adjustment the waveform 26 cannot be received in synchronization with waveform FIG. 3B due to the increased time of propagation.

Refer now to FIG. 4D showing the waveform 26 after it is adjusted by the amount "ABS moved" shown in FIG. 4A. It will be understood that after recognizing that the time slot 22B shown in FIG. 4A has moved it is now possible for the airborne station to adjust the next following time slot 23A shown in FIG. 4C so that it is moved to the position 23B shown in FIG. 4D and that the time slot 23B arrives at the ground station 12A in synchronization with the ground station's time of day clock.

Figure 5:
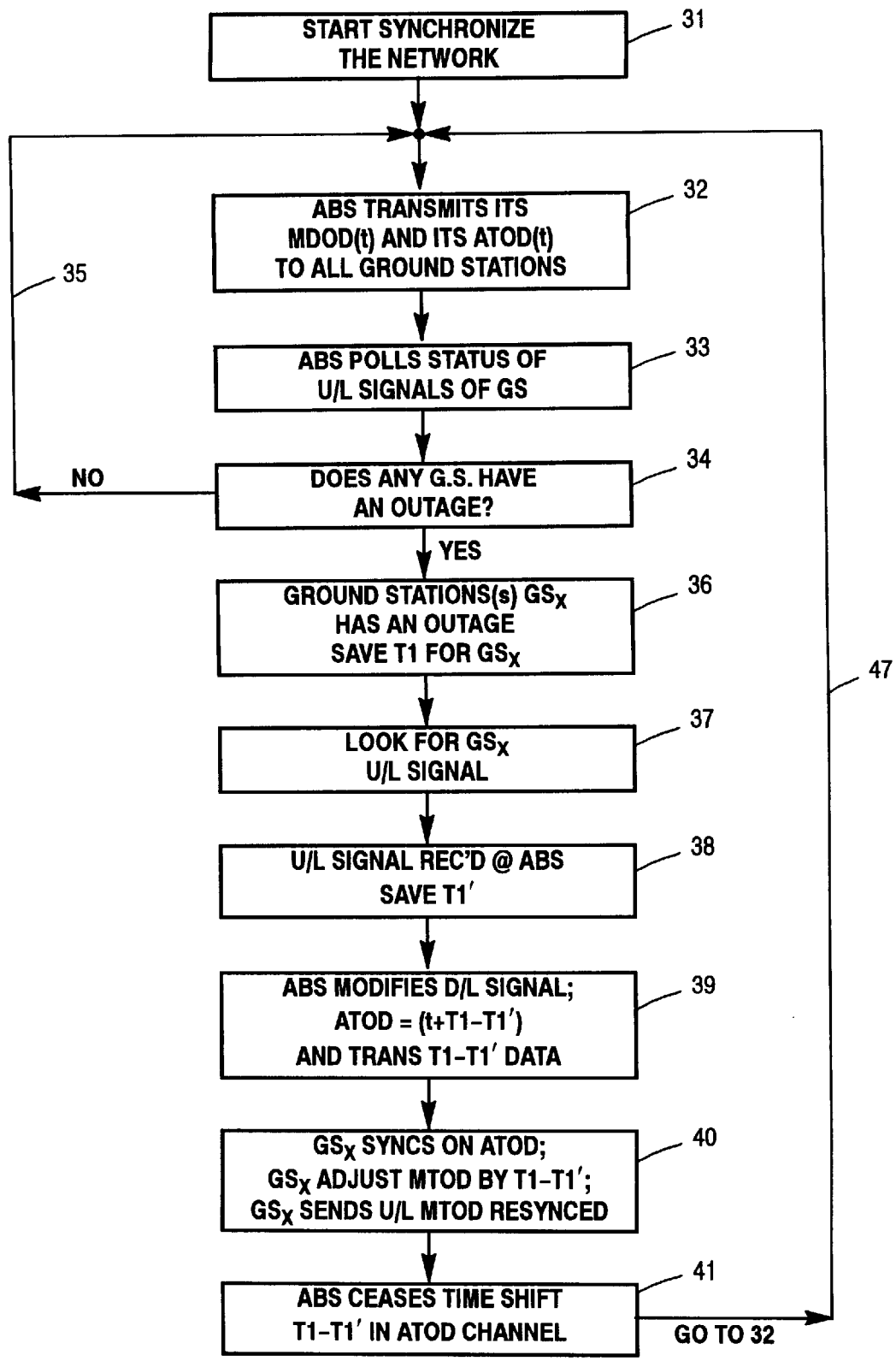
FIG. 5 is a block flow diagram of a control sequence of steps or events that are employed to reacquire a ground station after an outage has occurred.

Refer now to FIG. 5 showing a block flow diagram of a controlled sequence of the steps or events employed to reacquire a ground station after an outage has occurred. Block 31 shows that the control in the airborne station 13A starts with the synchronization of the network 20. Block 32 shows that the ABS control causes the transmittal of a waveform master time of day (t) and adjusted time of day (t) to all ground stations. The block 33 shows that the airborne station next polls the status of the up link signals from the ground stations. The control in the ABS platform makes the logical decision whether any of the ground stations have an outage by looking for an up link signal from each and every station. If all ground stations respond with status, then there is no outage as shown on line 35 and the logic returns to block 32. However, if there is an outage as detected by the absence of an up link signal from any ground station then the ground station $GS_x$ has an outage as shown at block 36. The control in the ABS saves the time T1 or propagation time to the ground station $GS_x$ at the time of outage. Then the control in the ABS looks for an up link signal from the ground station $GS_x$ as shown in block 37. When the up link signal from the ground station $GS_x$ is received at ABS the airborne station saves the new propagation time T1'. As shown at block 39, the control in the airborne station modifies the down link signal adjusted time of day (which is equal to t plus T1 minus T1') and transmits T1 minus T1' data to the ground station $GS_x$. The ground station $GS_x$ automatically and instantaneously syncs on the adjusted time of day signal and the ground station $GS_x$ adjusts its own master time of day clock by T1 minus T1'. Next the ground station $GS_x$ sends an up link signal that its master time of day has been resynced as shown at block 40. At block 41 the airborne station receives the acknowledgement and ceases the time shift T1 minus T1' in the adjusted time of day channel as shown in block 41. At this time the control signal on line 47 returns the control logic to block 32.

Having explained how the control in the airborne station generates a shifted signal that enables the ground station to instantaneously and automatically resynchronize its spread spectrum clock and adjust its own time of day clock to resync with the master clock in the airborne station it will be appreciated that all stations that have remained in synchronization and in communication with the airborne station are continuously receiving and transmitting data as was explained with reference to FIGS. 3 and 4 during each ground station's respective time division multiple access time slot.

Having explained how two orthogonal channels are employed by the airborne station and one of the channels is employed as the master time of day clock channel and the other orthogonal channel is employed as an adjustable time of day channel it will be appreciated that it is possible to have a larger number of channels than two. It may be possible to dedicate one adjustable channel for each of the ground stations provided that a method or some means of avoiding cross channel interference is maintained. In the preferred embodiment of the present invention, it is possible to have a very large number of ground stations using only two orthogonal transmitting station channels, simplifying the novel system explained hereinbefore.

What is claimed is:

1. Apparatus in a data link network system of the tying having a central node and a plurality of ground stations each having a transmitter/receiver for maintaining spread spectrum communications on the network, comprising:

a transmitter in said central node having a multi-channel transmitter for transmitting multichannel of quadrature and in phase spread spectrum data signals, one of the said multi-channels providing a fixed master time of day clock for said data link network system, the other of said multi-channels providing an adjustable time of day clock relative to said meter time of day clock, control means in said central node for sensing an outage between said central node and a ground station, said control means in said central node for calculating a propagation time T1 to said ground station, said control means in said central node for adjusting the timing of one of said spread spectrum signals to the transmitted relative to said master clock so that the adjusted signal is synchronized with the spread spectrum receiver in said ground station, and means in said ground station receiver for instantaneously reacquiring the transmitted adjusted spread spectrum signal transmitted by said central node to said ground station.

2. Apparatus as set forth in claim 1 wherein the ground station receiver comprises means for receiving data indicative of said propagation time T1 and for calculating a ground station clock time that is resynchronized with said master clock in said central node.

3. Apparatus as set forth in claim 2 wherein the ground station transmitter comprises means for transmitting data to said central node indicative of its network status including the reacquisition is established.

4. Apparatus as set forth in claim 3 wherein said central node receiver comprises means for receiving status data from said ground station and for readjusting said adjustable channel to the same time relationship with said master clock in said central node.

5. Apparatus as set forth in claim 1 wherein said control means in said central node comprises means for determining the status of all of said ground receivers and for reestablishing acquisition of any ground station after an outage is detected.

6. Apparatus as set forth in claim 5 wherein said control means further comprises means for allocating power and data rate of the spread spectrum signals in said multi-channels when all ground stations are reacquired and no outage exists.

7. A method of reacquiring synchronization between a multi-channel central node receiver/transmitter and receiver/transmitter of a ground station after an outage, comprising the steps of:
 sensing at the central node receiver/transmitter that an outage has occurred between a ground station and the central node receiver/transmitter,
 sensing at the central node receiver/transmitter when the outage has been removed and an up link data signal is received,
 determinating at the central node the propagation time required to spread spectrum signals to said ground station,
 adjusting the relative time of the spread spectrum signals in an in phase adjustable channel of said multi-channel receiver/transmitter while maintaining a master channel with master time of day spread spectrum clock signals,
 transmitting said adjusted spread spectrum signals to said ground station said adjusted spread spectrum clock signal being adjusted to arrive in synchronization with the spread spectrum clock signals in said ground station receiver,
 instantaneously reacquiring said adjusted spread spectrum signals and data accompanying said adjusted spread spectrum signals, and
 employing said accompanying data to reset the relative time of said spread spectrum clock signals in said ground station receiver so that subsequent spread spectrum signals from said master channel are received in synchronization with the spread spectrum receiver in said ground station.

8. The method as set forth in claim 7 which further includes the step of transmitting from said ground station to said central node a status signal that is synchronized to arrive at said central node at a predetermined time.

9. The method as set forth in claim 8 wherein said predetermined time comprises a unique time division multiple access time slot.

10. The method as set forth in claim 7 wherein said step of transmitting said adjusted spread spectrum signals to said ground station comprises transmitting said adjusted signals until an acknowledgement signal is received from said ground station.

11. The method as set forth in claim 10 which further includes ceasing transmittal of said adjusted signals to said ground station, and
 returning said adjusted time of said spread spectrum signals in said adjustable channel to synchronization with the master time of day clock signals to said master channel.

12. The method as set forth in claim 11 which further includes the stop of controlling the power and data rate of channels of said multi-channel node independently of each other.

* * * * *